Aug. 4, 1936.  E. A. WEAVER  2,049,553
ELECTRICAL CONDENSER
Original Filed Nov. 24, 1926
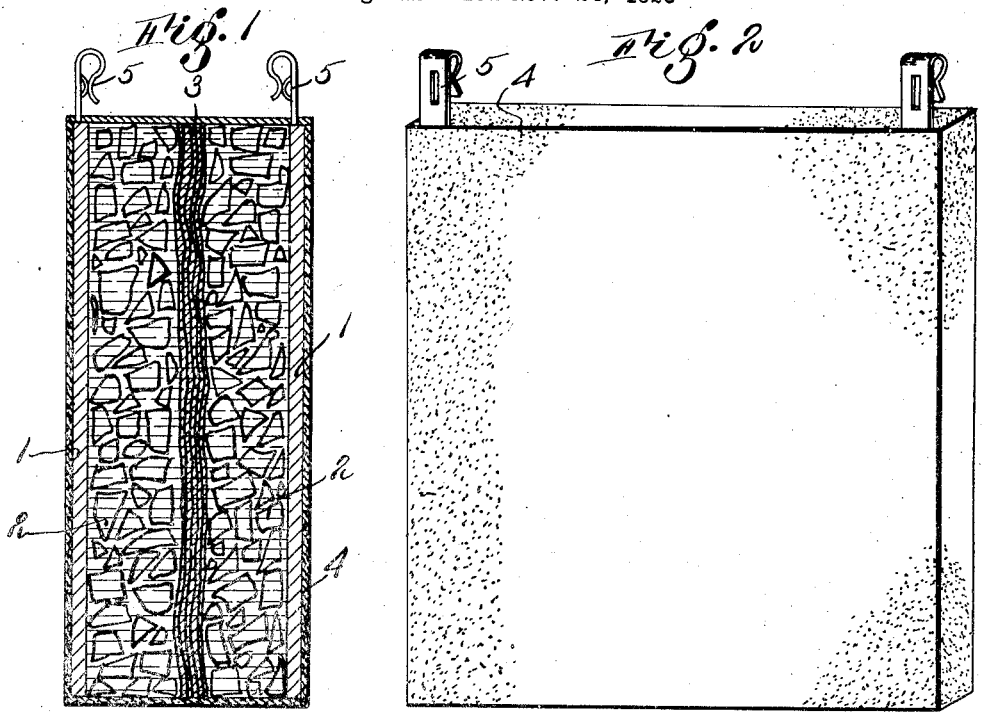
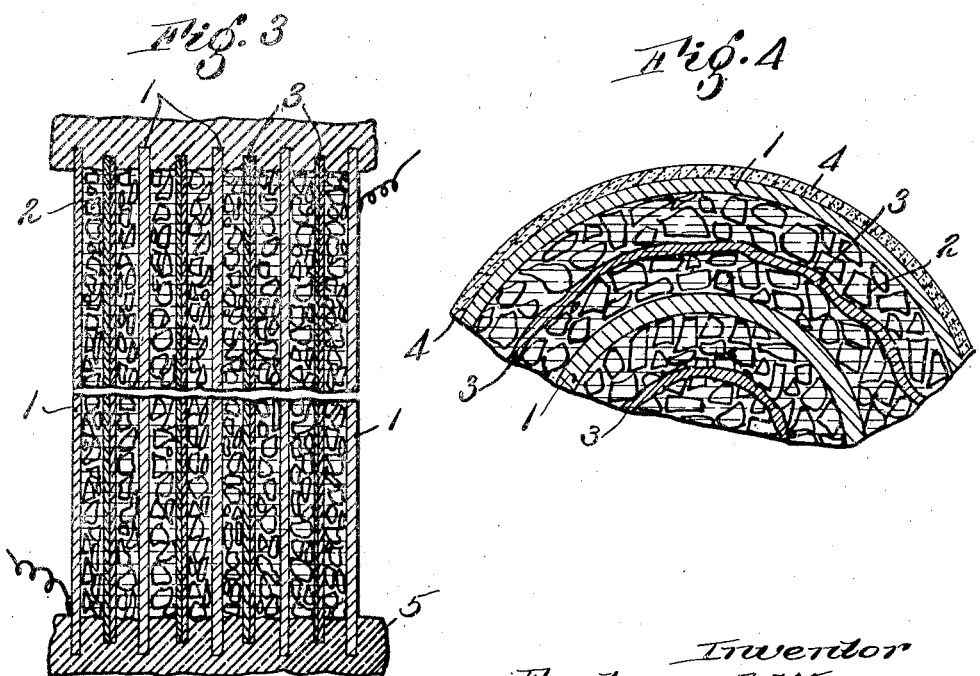
Inventor
Eastman A. Weaver
by Roberts Cushman + Woodberry.
Attys.

Patented Aug. 4, 1936

2,049,553

UNITED STATES PATENT OFFICE 2,049,553

ELECTRICAL CONDENSER

Eastman A. Weaver, Cambridge, Mass., assignor, by mesne assignments, to Raytheon Manufacturing Company, Newton, Mass., a corporation of Delaware Application November 24, 1926, Serial No. 150,484
Renewed November 25, 1930

17 Claims. (Cl. 175—315)

The present invention relates to devices for storing electrical energy and in particular to a condenser formed by employing electrodes that are immersed in electrolyte and by passing an electric current between electrodes to produce a film thereon. This film subsequently acts as a dielectric of high inductive capacity, the stress of which caused by the applied potential enables the unit to retain electrostatic energy. After the formation of the film, electrolysis appears to cease and under proper operating conditions, the condenser is subsequently devoid of gas formation, thus lending itself admirably to sealing, if desired. Now, I have discovered that the active electrodal surfaces i. e. the area presented to the liquid may be considerably increased in effect by placing in juxtaposition to the electrodes a porous conducting mass that allows ready passage of liquid to each plate; in turn, this produces a phenomenal change in the ability of the condenser to absorb electrostatic energy.

Accordingly, the primary object of my invention is to produce a low voltage condenser having ability to store considerable amounts of electrical energy for short periods of time. Another object is to devise a structure that offers cheapness and simplicity of manufacture but nevertheless has long life and is efficient in operation.

Due to the large capacity per unit area I am able to connect four or five units in series, each of which charges on 1.5 to 2.5 volts and still obtain sufficient capacity in aggregate for practical purposes. Thus the multi-condenser unit described hereinafter functions admirably as a low impedance shunt for current ripples ordinarily present in the output circuit of a rectifier supplying a thermionic tube filament circuit of standard potential. While its operation as a current filter is marked, the condenser has a broad field of utility throughout circuits in general that require a condenser of relatively small dimension and low voltage but capable of storing a charge of considerable magnitude.

With the aforesaid and other objects in view, my invention will be more fully described in relation to the specific embodiments illustrated in the drawing in which like reference characters designate corresponding elements throughout the several figures.

Fig. 1 is an elevational view in cross section of the improved condenser;

Fig. 2 shows, in perspective, a complete unit;

Fig. 3 represents a multiple unit cell containing four condensers effectively in series and illustrates a mode of manufacture that I have found practical for quantity production; and Fig. 4 shows my condenser in cylindrical form.

In the particular embodiment illustrated by Figs. 1 and 2 numeral 1 designates two electrodes of a material, as graphite, lead, iron, nickel or one of its alloys, ither in the solid or gauze form, characterized by chemical inertness with respect to the electrolyte employed, even when subjected to electric potential. Of the substances mentioned, lead, graphite and an iron alloy usually designated "stainless or Delhi iron" containing approximately 16% chromium and 1 to 2% silicon, are especially desirable by reason of the relatively high voltage that each will withstand without causing decomposition of the liquid, the maximum potential having an order of magnitude 2.3, 2.2 and 2.1 volts respectively. However, from an economic standpoint, I prefer electrodes of the iron alloy. In view of the electrode similarity, my condenser has the distinct advantage of lacking initial polarity. However, it is apparent that the features described hereinafter are equally applicable to electrodes of dissimilar material. By numeral 2 I have indicated a quantity of electrically conducting porous substance in a flake, finely divided or shredded form, the surfaces of which in the aggregate are considerably larger than the projected area. I have found by experiment that flake graphite is particularly desirable in this connection although satisfactory results are obtainable when nickel in comminuted form, metal wool, such as, for example, steel wool, or a powder of the electrode material is utilized. As between graphite and nickel, the choice apparently rests with the former because it lacks the tendency to form protecting surface layers of oxide and, hence, is less likely to insulate the separate particles. As found by the theoretical determination of voids, the total surface offered to the liquid by a coarse and fine particle mix in the proportion of roughly three to one appears to be maximum for a given projected area and particle sizes. Th graphite comprises a relatively thin layer or coating and may be placed in close juxtaposition to one or more electrodes being pressed against the plate by sheets 3 of blotting or filter paper or the like. The latter is useful as an absorbent of electrolyte bringing to the electrodes a ready supply of current carrier without danger of spillage. It is apparent that the electrolyte should not be a strong reactant and should preferably be mildly alkaline; such salts include the carbonates, borates, hydroxides, oxalates and acetates of the alkali metals in general. I prefer to use potassium carbonate (K₂CO₃) on account of its hygroscopic nature in order that it may less readily give up moisture to the atmosphere in the event that container 4 may puncture, break or become porous. If by way of impurity in the borate, the halide is present producing an injurious effect, a small quantity of lead should be added preferably in particle form. It is apparent that instead of liquid, I may employ a semi-solid electrolyte as jelly or paste. Except for the electrode leads passing to terminals 5 the container may be entirely sealed by coating with a flexible sealing compound as paraffin or tar and preferably leaving no air space within since oxygen tends to depolarize the cell producing variable leakage current and also uneven distribution of potential. The sealing compound should be of a nature to avoid cracking under temperature changes or in case of the evolution of minute quantities of gas.

While I do not limit myself to any particular mode of manufacture, the following method has been found to be particularly adapted. The absorbent paper is first wetted and laid on an open sided box containing the porous or particle mass and the box given a series of shakings by hand or otherwise until the particles cling to the paper cover as a layer, the thickness of which may be modified by the texture and witness of the paper surface. As indicated in Fig. 3 which shows four units effectively in series, the coated paper is then laid against electrode 1 in such manner as to bring the granular covering in contact with the metal, pressure being then applied to the extent of one to two pounds per square inch in order to secure good electrical contact between particles and electrodes. Satisfactory results are also obtainable by rubbing or dusting the granules directly into the pores of the paper or onto the electrode surface, using an adhesive if necessary. The number of paper thicknesses intervening the electrodes is immaterial; if two be used, each paper need be graphited only on one side as illustrated. Another method of affixing the granules is to fold the particle coated paper about the electrode as an envelope, the crease at bottom effectively preventing current leakage about the edges of electrodes. When as many cells as are desired in series have been built up in this way, the pile is clamped tightly together and the edges sealed by dipping in flexible compound 5 leaving one edge or portion thereof unsealed until after the final introduction of solution and removal of air which may be accomplished by squeezing and releasing the unit while immersed in the electrolyte. In order to more readily distribute electrolyte throughout the multi-cell unit, I may perforate the inner plates. The remainder of the condenser is then sealed to form a solid and compact unit after which leads may be affixed in the usual manner. As will be apparent, a condenser made in the manner described is self-contained which lends itself readily to economic production although, if desired, a receptacle may be provided.

While the detailed processes involved in the operation of such a condenser are not precisely known, it is recognized that electrical conduction from an electrolyte to an inert electrode without the formation of gas or the deposition or dissolution of material, forms a film of pseudo-gas on the electrode which tends to inhibit further current. The action is partly that of a dielectric layer of high inductive capacity and partly like a back electromotive force such as a storage-battery would give. The latter action is practically as effective as the former for the purposes in view. Both actions are effective in direct proportion to the electrode area, hence are greatly magnified by the particle layer assuming good contact between particles.

If desired I may construct my condenser in spiral form as illustrated by Fig. 4. A spacer of granule-coated blotting or filter paper is rolled between adjacent sheets of metal on a mandrel and is afterwards saturated with electrolyte. As in the previously described structure the cylindrical condenser may also be enclosed in a waterproofed container.

I claim:

1. As an article of manufacture a sealed receptacle containing a plurality of electrodes, said electrodes being coated with flake graphite and separated by an electrolytic dielectric.

2. A condenser comprising electrodes of an iron alloy containing approximately 16% chromium and 1% silicon, said electrodes being separated by an electrolyte.

3. A condenser comprising electrodes of an iron alloy containing approximately 16% chromium and 1% silicon, said electrodes being coated with flake graphite and separated by an electrolyte.

4. A condenser comprising a sealed receptacle comprising a plurality of film forming electrodes, a porous layer of metallically conducting substance between said electrodes and on at least one of them and an electrolyte-containing absorbent separating said electrodes.

5. A condenser comprising film forming metallic members immersed in a solution containing hygroscopic material, one of said members having a coat of a comminuted electrically conducting material.

6. Electrical apparatus comprising a plurality of film forming electrodes, a layer of comminuted metallically conducting material on at least one of said electrodes and a liquid absorbent separating said electrodes, said electrodes being immersed in an electrolyte.

7. A condenser having electrodes comprising an alloy consisting largely of iron and having a substantial fraction of chromium and a small amount of silicon.

8. A condenser having electrodes consisting of an iron alloy of which one-sixth is chromium and a small amount of silicon.

9. A condenser comprising a sealed receptacle containing a plurality of iron electrodes, said electrodes being coated with flake graphite and separated by an electrolyte.

10. An electrical condenser comprising a plurality of electrodes, and an electrolyte, at least one of said electrodes having portions thereof composed of metallic wool.

11. An electrical condenser comprising a plurality of electrodes, and an alkali electrolyte therefor, at least one of said electrodes having portions thereof in a finely-divided form.

12. An electrical condenser comprising a plurality of electrodes, and an alkali electrolyte therefor, at least one of said electrodes having portions thereof composed of metallic wool.

13. An electrical condenser comprising a plurality of electrodes and an electrolyte, each of said electrodes having portions thereof in finely divided form.

14. An electrical condenser comprising a plurality of gas film-forming electrodes, and an electrolyte, each of said electrodes having portions thereof in finely-divided form.

15. An electrical condenser comprising electrodes of a metal which will respond to electrolytic action in a manner to form a composite partially solid current-blocking film thereon having in surface contact therebetween a mixture of fine particles of the same metal which will respond to electrolytic action in a manner to form a current blocking film thereon and a film-forming electrolyte.

16. An electrical condenser comprising metallic plate electrodes which will respond to electrolytic action in a manner to form a composite partially solid current-blocking film thereon having in surface contact therebetween a mixture of fine particles of the same metal capable of being film-formed and a film-forming electrolyte held in suspension by porous spacer material.

17. An electrical condenser comprising metallic plate electrodes which will respond to electrolytic action in a manner to form a composite partially solid current-blocking film thereon having in surface contact therebetween a mixture composed of fine particles of the same metal and a film-forming electrolyte held in suspension by a reticular body.

EASTMAN A. WEAVER.